May 29, 1962

H. J. CHALL 3,036,763

CALCULATING MACHINE FOR CONVERTING SCALE
READOUT TO POUNDS AND OUNCES

Filed May 19, 1959

FIG_2

May 29, 1962  H. J. CHALL  3,036,763
CALCULATING MACHINE FOR CONVERTING SCALE
READOUT TO POUNDS AND OUNCES

Filed May 19, 1959  5 Sheets-Sheet 3

FIG.3

FIG_4

FIG_5

— 
3,036,763
Patented May 29, 1962

3,036,763
CALCULATING MACHINE FOR CONVERTING SCALE READOUT TO POUNDS AND OUNCES
Harold J. Chall, Castro Valley, Calif., assignor to Friden, Inc., a corporation of California
Filed May 19, 1959, Ser. No. 814,324
17 Claims. (Cl. 235—61)

This invention relates to calculating machines, such as adding machines, and in particular to solenoid-operated adding machines operated from an adjacent apparatus, such as an electrically operated readout of a weighing machine.

It is an object of this invention to provide an arrangement whereby a value of ounces, or pounds and ounces, or a succession of such values, read out of an adjacent readout apparatus of a weighing machine, will be inserted into the accumulator of a solenoid-operated adding machine. The solenoid-operated adding machine will then automatically determine, by a sensing arrangement of its accumulator, to add, by an electrically-operated control program, a constant value of "84" (the complement of "16") to the previous value of ounces inserted, if the value of ounces is "16" or more. When the value of "84" is so added to the previous value, the resulting total will be printed, showing the converted value as pounds and ounces.

Another object of this invention is to provide an arrangement whereby an electrically operated control program will be initiated as many times as required to add a value of "84" to the accumulator, to change the previous value, by the usual tens-transfer means, to an integral number of pounds and the fractional pound, if any, in ounces. For example, the extreme value of "99" ounces can be converted to the correct pounds and a fractional pound in ounces by repeated control program operations, automatically initiated, to print this transformed total as "6" pounds "03" ounces for visual inspection.

Other objects and advantages will become apparent from the following description and appended claims in conjunction with the accompanying drawings wherein:

The solenoid operated adding machine that will be referred to in this present disclosure for exemplification of the invention, consists basically of the identical mechanism as shown in my Patent No. 2,832,530 issued April 29, 1958 under the title of "Value Selecting and Transmitting Mechanism for Listing Adding Machine." The main difference between that machine and the present invention is that the value and control keys are solenoid-operated, and other slight additional changes have been made to the accumulator mechanism that will be fully described hereinafter. It will be understood, however, that the present invention could be applied to other adding machines, and that it could be applied to one in which the value keys were normally manually operated.

A brief description will be given of the selection, actuating and accumulator mechanisms of the commonly known adding machine in order to illustrate the present invention. A more complete description of these mechanisms appears in the aforementioned patent.

The value keys 20 of the selection mechanism are received in top and bottom fixed plates 21 and 22 for vertical movement and are spring-urged to their upper limited position by suitable springs 23. Individual electrically operated value solenoids 24 are positioned directly above the value keys 20 and the solenoids are provided with suitable movable plungers 25 capable of depressing the value keys when the solenoids are energized in a well-known manner.

Value key stems 26 extend below the bottom plate 22 and engage a series of cooperating upturned noses of value selecting bellcranks 27. The bellcranks 27 are pivoted at their respective elbows on a transverse rod 28 and have rearwardly directed curved extensions 29. The curved extensions 29 are so formed as to lie in a vertical plane in line with a corresponding number of settable pins 30, in a position that is commonly known as the selection station. With the above arrangement, when a value key 20 is depressed by an energized solenoid 24 it will swing its cooperating bellcrank 27 rearwardly to set a corresponding settable pin 30. There is a column of settable pins 30 for each order of the selection mechanism, the pin box being a fixed part of a shiftable selection carriage 38.

The shiftable carriage 38 comprises a number of ordinally arranged selection sectors 39 equal to the number of columns of settable pins 30. The selection sectors are provided with forwardly directed dial portions 40 numbered from "0" to "9," the numerals representing the amount of the value key depressed. These numerals, when set, can be viewed through a sight opening, not shown, in the machine cover. The selection sectors 39 also comprise rearwardly directed feed segments 41 for returning the selection sectors back to their home, or "0," position.

The selection sectors 39 are held in their inoperative, or "0" position, against the urgency of their springs 42, by a release latch lever 43 pivoted on a transverse rod 49 located in the lower part of a pin box 31. There is a latch lever 43 for each ordinal column of settable pins 30.

Each of the value key stems 26 (other than "0") is provided with a bent portion 44 located between the top and bottom plates 21 and 22. These bent portions 44 overlie a rod 45 that extends longitudinally of the value key box. This rod 45 operates the escapement of the selection carriage 38 to step the carriage in a one-step leftward movement after each operation of a value key. A full description of the shifting of the selection carriage can be found in the above-mentioned patent.

A release lever 46, located below the bottom key plate 22, has an upstanding nose 47 that extends up through an aperture in the bottom plate 22 to engage the underside of the rod 45. The lever 46 is mounted intermediate its length on a pivot pin 48 mounted on a supporting bracket (not identified), thereby supporting the lever 46 for rocking movement. The rearward end of the lever 46 is connected to a link 50 that extends downwardly and is connected at its lower end to a release arm 51. The release arm 51 has an extension that is positioned in opposition to the release latch lever 43, then in the selection station to move the latch lever 43 (in a clockwise direction in FIG. 1), to release the coordinal selection sector.

It now can be seen that with the depression of a value key 20, to set a settable pin 30, the downward movement of the key stem 26 will also rock the release latch 43 about its pivot 49 (clockwise in FIG. 1) and against the urgency of its spring 52. The rocking of the latch lever 43 will release the selection sector 39 at the selection station, the sector then being rocked by its spring 42 (in a clockwise direction in FIG. 1) until it is stopped by a set pin 30. This will angularly position the dial portion 40 of the selection sector 39 to register a value equal to the key depressed to be viewed in the sight opening.

This shiftable selection carriage 38 will then be stepped in sequential leftward steps by the continued full depression of a value key 20, as fully described under the heading, "Escapement Mechanism" in the above-mentioned patent.

Positioned to the rear of the selection carriage 38 is a series of power-operated actuator sectors 58 (FIG. 2), two more in number than the selection sectors 39. These actuator sectors 58 are driven, by a resilient means not shown, first in a downward direction, with a slight dwell at the bottom of the stroke, and then returned upwardly to their full-cycle position.

Figure 2:
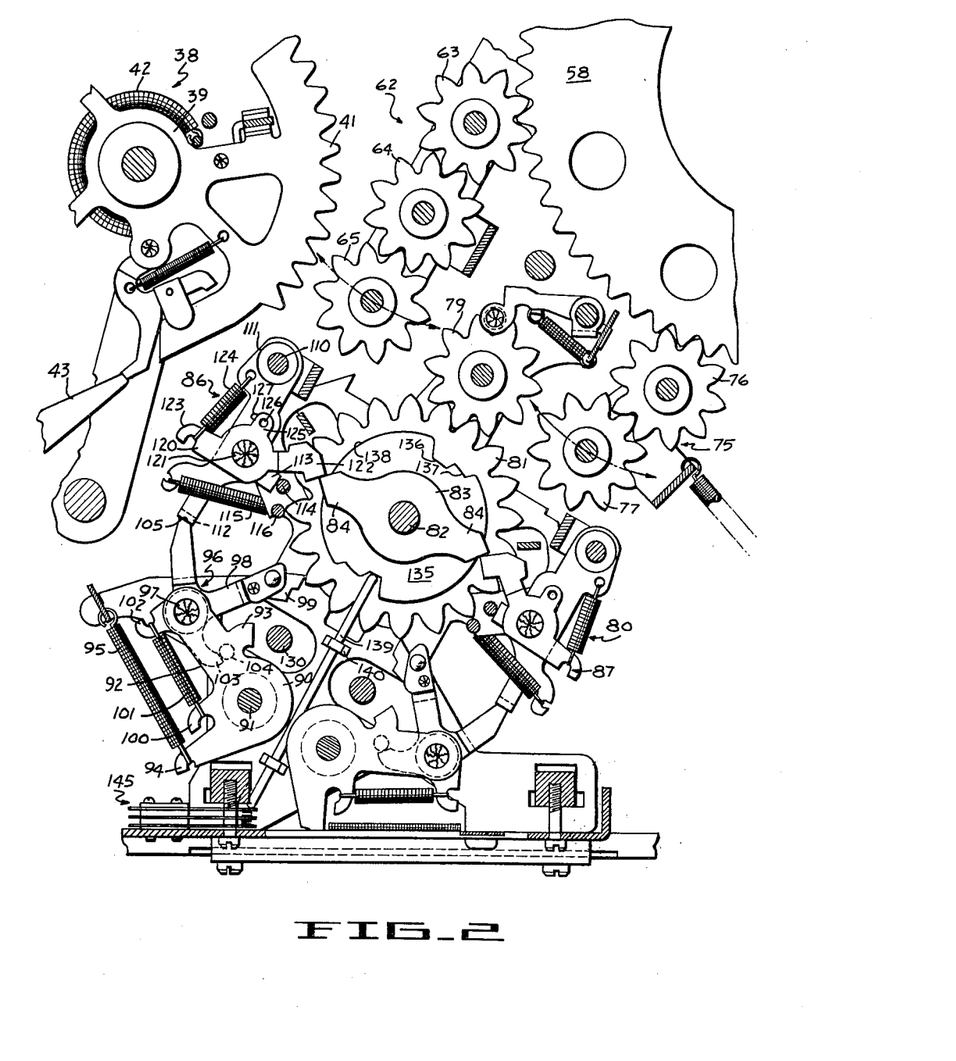
FIG. 2 is a longitudinal cross-sectional view of the accumulator and actuating mechanism, the section being taken to the left of the units order of the accumulator and showing in particular the sensing mechanism of the tens-order with its cam and plunger arrangement for co-operating with its electrical switches.

Located between the selection sectors 39 and the actuator sectors 58 is a positive pendent gear transmission 62. This pendent transmission can be moved by suitable control keys to swing the pendent forwardly into engagement with the coordinal feed segment 41 of the selection sector 39, or rearwardly to engage an accumulator drive gear 79. The positive transmission 62 has a central, or neutral, position as shown in FIG. 2. The gear transmission 62 consists of three spur gears, 63, 64 and 65. The top gear 63 is held constantly in engagement with its respective actuator sector 58 and a print drive gear, which is not shown herein.

Positioned to the rear of the positive gear transmission 62 is a negative pendent gear transmission 75. It consists of two spur gears 76 and 77, the top gear 76 being held constantly in engagement with its corresponding actuator sector 58. This gear transmission 75 will be swung forwardly and rearwardly by its control means, not shown herein. In its forward, or operative position, it will engage the lower gear 77 with the accumulator drive gear 79, and in its rearward, or neutral, position shown in FIG. 2 it is out of engagement with the accumulator drive gear.

Figure 3:
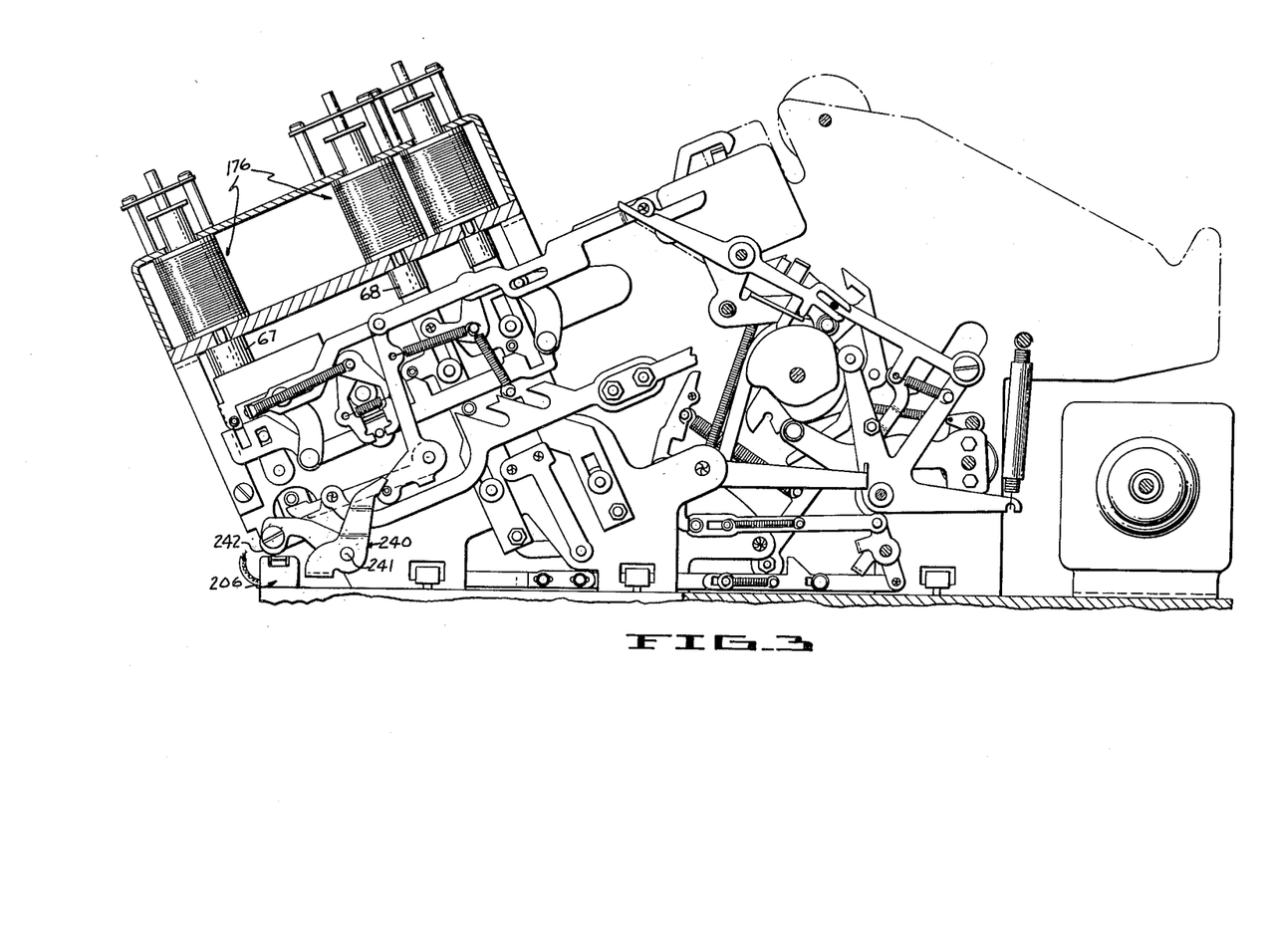
FIG. 3 is a longitudinal elevational view of the right side of the solenoid input adding machine, showing in particular the solenoids that operate the conventional add and subtract control keys and the add cycle switch.

When the value keys 20 are initiated by their respective solenoids 24 they will position a selecting sector 39 in accordance with a value entered. A control key is then operated by its solenoid to swing the positive gear transmission 62 into engagement with the selection sectors 39. Referring to FIG. 3, the add key and subtract control keys 67 and 68 are seen in relation with their solenoids to initiate the control cycles of the machine as required. The subtotal key, not shown herein, is located directly behind the add key 67.

The actuator segments 58 will then be driven down, by the resilient power means (not shown), and through the connection of the positive pendent transmission 62 with the selection sectors 39, will reset the selection sectors 39 back to their "0," or full-cycle position. On doing so, the actuators 58 will be angularly positioned differentially as determined by the value read out of the selection sectors 39. The actuators 58, on their downstroke, will have positioned the print gear mechanism (not shown) to print this value.

As mentioned above, there is a slight pause or dwell after the downstroke of the actuator sectors 58, during which time either the positive or negative pendent gear transmission 62 or 75 can be swung into engagement with the accumulator drive gears 79. The entry of the value that has been angularly set in the actuator sectors 58 into an accumulator 80 is accomplished when the actuator segments 58 are driven upwardly to their upper, full-cycle position.

The accumulator 80 is a unitary structure positioned below the actuator sectors 58, with the ordinally arranged accumulator drive gears 79 positioned between the positive and negative gear transmissions 62 and 75. The accumulator 80 registers a true credit balance, having both a positive and negative tens-transfer mechanism. A series of ordinally arranged twenty-tooth accumulator gears 81 is arranged on a central shaft 82. A tens-transfer actuating cam 83, one fixed to each accumulator gear 82, has two oppositely disposed cam noses 84 in cooperative arrangement with the corresponding tens-transfer, or carry, mechanism.

A positive tens-transfer mechanism 86 is located to the left of the accumulator gear 81 and a negative tens-transfer mechanism 87 to the right, as viewed in FIG. 2. With this arrangement, when an accumulator gear 81 passes from its "9" to its "0" position, a tens-transfer mechanism 86 or 87 will be tripped to rotate the adjacent higher order accumulator gear 81 one increment of movement, equal to a registered value of "1," additively or subtractively, as required.

The positive tens-transfer side of the accumulator 86 will be briefly described to suffice for both tens-transfer mechanisms as the negative tens-transfer mechanism 87 is identical in structure. A series of bellcrank levers 90, equal in number to the number of accumulator gears 81, is rockably mounted at their elbows on a shaft 91 in side-by-side arrangement. Each bellcrank lever has a leg 92 extending upwardly from the pivot shaft 91. Intermediate the length of this leg an abutment 93 is provided, and is directed upwardly toward a control bail, or rod, 130. The operation of rod 130 will be described later in reference to the resetting of the tens-transfer mechanism.

Each bellcrank lever 90 also has a short arm projecting downwardly from the pivot 91, which arm is provided with a hook formation 94. This hook formation seats one end of a spring 95 that is secured at its other end to a fixed crosspiece in the accumulator spacer plates to urge the bellcrank 90 to a transferring position (in a clockwise direction in FIG. 2).

A tens-transfer pawl 96 is carried by each bellcrank 90, being pivotally mounted on a pin, or other suitable connection 97, on the upper end of the bellcrank leg 92. Each pawl has, among other things, an angularly shaped arm 98 directed inwardly toward the associated accumulator gear 81. This arm is provided with a driving tooth 99 which is offset laterally to the left, so that when the latch lever 90 is released the tooth 99 will engage a gear tooth on the accumulator gear 81 of the next higher order to rotate that accumulator gear one unit space. The limit of movement of one unit space will be determined by the driving tooth engagement 99 with a fixed stop, not shown.

The bellcrank 90 is also provided with a spring hook seat 100 suitable to hold a spring 101 positioned between the bellcrank and a short spring hook 102 on the pawl 96. The spring 101 biases the pawl 96 to its normal position (in a counter-clockwise direction as viewed in FIG. 2). The pawl 96 will be held in this limited counter-clockwise position by a short leg extension 103 abutting a fixed pin 104 that is fixed to the bellcrank 90. The pawl 96 is also provided with a latching shoulder 105 directed upwardly from the pivot 97.

A transverse shaft 110 located above, and to the left of, the accumulator gears 81 supports a series of positive latch levers 111. The levers 111 extend downwardly from the shaft 110 and carry, at their lower ends, an abutment formation 112 which engages the shoulder 105 of the transfer pawl 96, operative in the next highest order, to hold this pawl in retracted position.

Each latch lever 111 has, intermediate its length, an inwardly directed nose formation 113 which abuts against a stop bar 114 when the lever 111 is in its latching engagement with its associated pawl 96, to limit the rocking of the lever 111 about the shaft 110. A tension spring 115 connected between the lower end portion of the latch lever 111 and a tie rod 116 resiliently urges the latch levers to rock (counter-clockwise in this figure) toward the accumulator gear assembly.

A live pawl, or actuating dog, 120 is pivotally mounted on the side of each latch lever 111, as by a pivot stud 121. The actuating dog 120 has an abutment 122 which projects from the pivot 121 into the path of the noses 84 on the outer ends of the tens-transfer cam 83 carried by the corresponding accumulator gear 81. The actuating dog 120 is provided with a spring hook seat 123 holding a spring 124, the other end of which is connected to the upper end of the latch lever 111. The spring 124 resiliently urges the actuating dog 120 to rotate (clockwise in FIG. 2) relative to the associated latch lever 111 until a stop arm 125 terminates the movement. The stop arm 125 has limited movement determined by a pin 126 on the stop arm riding in a slot 127 of the latch lever 111. The stop arm 125 yields when pawl 120 is contacted by the transfer cam 83 and the accumulator gear assembly 81 rotates in a negative direction (clockwise in this figure). In this situation, the pawl 120 rocks counter-clockwise about the pivot 121. However, when the accumulator gear rotates in a positive direction, the tens-transfer cam 83 engages its nose 84 with the abutment 122 of the live pawl 120, applying pressure in a downward direction. In that event, the pawl 120 cannot rock relative to the associated latch lever 111. Therefore, the latch lever 111 will be forced away from the accumulator gear assembly, thus moving the abutment 112 out of engagement with the shoulder 105 of its associated transfer pawl 96. This will free the transfer pawl 96 and the associated bellcrank 90 of the next higher order, which is urged by its spring 95, for clockwise rocking movement about the shaft 91. Such rocking of the bellcrank and pawl moves the tooth 99 against the adjacent tooth of the associated accumulator gear 81 to rotate this accumulator gear one unit space in a positive, or counter-clockwise, direction.

The operation of the positive tens-transfer mechanism is controlled by the bail, or rod, 130, mentioned above. This bail 130 has three operative positions: a position to restore the pawls 90 that have been unlatched; a full-cycle position in which a tens-transfer operation is permitted to take place; and an intermediate position, shown in FIG. 2, in which it is moved slightly from its restore position in order to prevent the pawl 90 from relatching with the corresponding latch lever 111 when the tens-transfer cam 83 moves past the abutment 122 but insufficient to permit tooth 99 to engage its associated gear. A detailed description of the above bail and its operation can be found in the above-mentioned patent. The negative tens-transfer mechanism 87, located on the oppositely disposed side of the accumulator gears 81, is identical in construction and differs only in a direction of rotation given to the accumulator gear 81.

When an accumulated total is taken from, or read out of, the accumulator 80, the accumulator gears 81 are rotated by the downward stroke of the actuator sectors 58. The rotation will be opposite to that in which these gears were rotated to accumulate a positive or a negative total.

The total operation, in brief, will position either the positive or negative gear transmissions 62 or 75 into engagement with the accumulator drive gear 79, as controlled by a sign sensing mechanism not pertinent to the present invention and hence not described herein, and blocks the operation of the transfer mechanisms. Then, at the end of the downstroke of the actuator sectors 58 it will have zeroized the accumulator and will print the value previously standing in the accumulator. On the return, or upward, stroke of the actuator sectors 58, the gear transmissions 62 and 75 will be disengaged from the accumulator drive gear 79 to leave the accumulator clear of a value.

A subtotal operation is identical on the downstroke of the actuators 58 to that of the total operation in that it also clears the accumulator to its "0" position and prints the value previously standing in the accumulator; but on the upstroke of the actuator sectors 58 it will hold whichever gear transmission was previously engaged with the accumulator drive gear 79, to restore the value back into the accumulator after it is printed. The printing takes place at the lowest part of the stroke, during the dwell of the actuator sectors.

The accumulator 80 of the machine has been modified to allow sensing of a value in the first two orders, that is, the units and tens-order. These two orders are adapted and designed to receive a value in ounces. This sensing is necessary for the machine must automatically determine whether to initiate an electrical control program to insert a constant value of "84" into the tens and units order, respectively, to convert the ounces inserted therein, to pounds.

Figure 4:
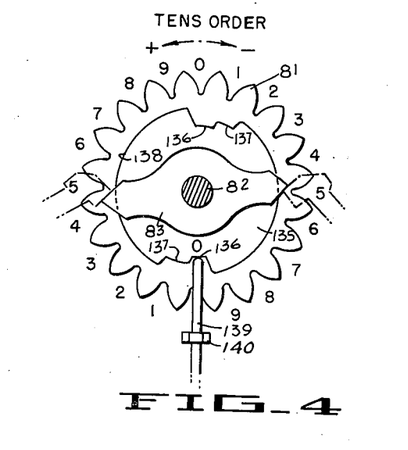
FIG. 4 is a detailed view of the tens-order accumulator gear with its sensing cam and the tens-transfer arrangement of this gear assembly.
Figure 5:
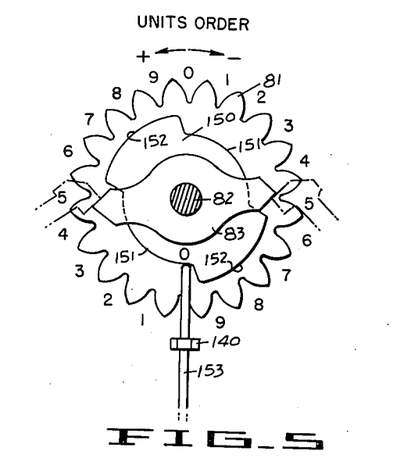
FIG. 5 is a detailed view of the units order accumulator gear with its sensing cam and the tens-transfer arrangement of this gear assembly.

This is accomplished by using sensing cams 135 and 150 on the units and tens-order of the accumulator. The tens-order sensing cam 135 can be seen in relation to its accumulator gear in FIG. 2 and a detail of this cam is shown in FIG. 4. A detail of the units order sensing cam is shown in FIG. 5. Both cams are shown in the schematic arrangement in FIG. 6.

Referring to FIGS. 2 and 4, the tens-order cam 135 is fixedly mounted between the accumulator gear 81 and the tens-transfer cam 83. It is provided with identical, diametrically opposed stepped depressions, or notches: a low, or "0," notch 136 of two increments in depth; an intermediate, or "1," notch 137 of one increment in depth; and a high lobe 138 extending through the "2" to "9" positions of the cam. The full-cycle, or "0," position of this cam is shown in FIGS. 4 and 6.

A plunger rod 139 is journalled for vertical movement in bearing sleeves on a pair of spaced-apart brackets 140 secured to the adjacent spacer plate of the accumulator. The top part of the plunger 139 is rounded off to provide a riding surface, as it is in constant engagement with the periphery of the sensing cam 135. The lower end of the plunger 139 is positioned on the surface of a double-leaf, single and double circuit switch 145.

The units order accumulator gear also has a cam and plunger arrangement, as seen in FIG. 5. The units sensing cam 150 differs in shape in that it has two diametrically opposed low portions 151 extending from the "0" through the "5" position of its gear and diametrically opposed high portions 152 extending through the "6" to "9" positions of its accumulator gear 81. The full-cycle, or "0" position of this cam is shown in FIGS. 5 and 6. A plunger rod 153 is associated with this cam, the upper end engaging the periphery of the cam. The lower part of the plunger rod 153 associated with the units order cam 150 rests on a single-leaf, single circuit, switch 158, as seen in FIG. 6.

Figure 6:
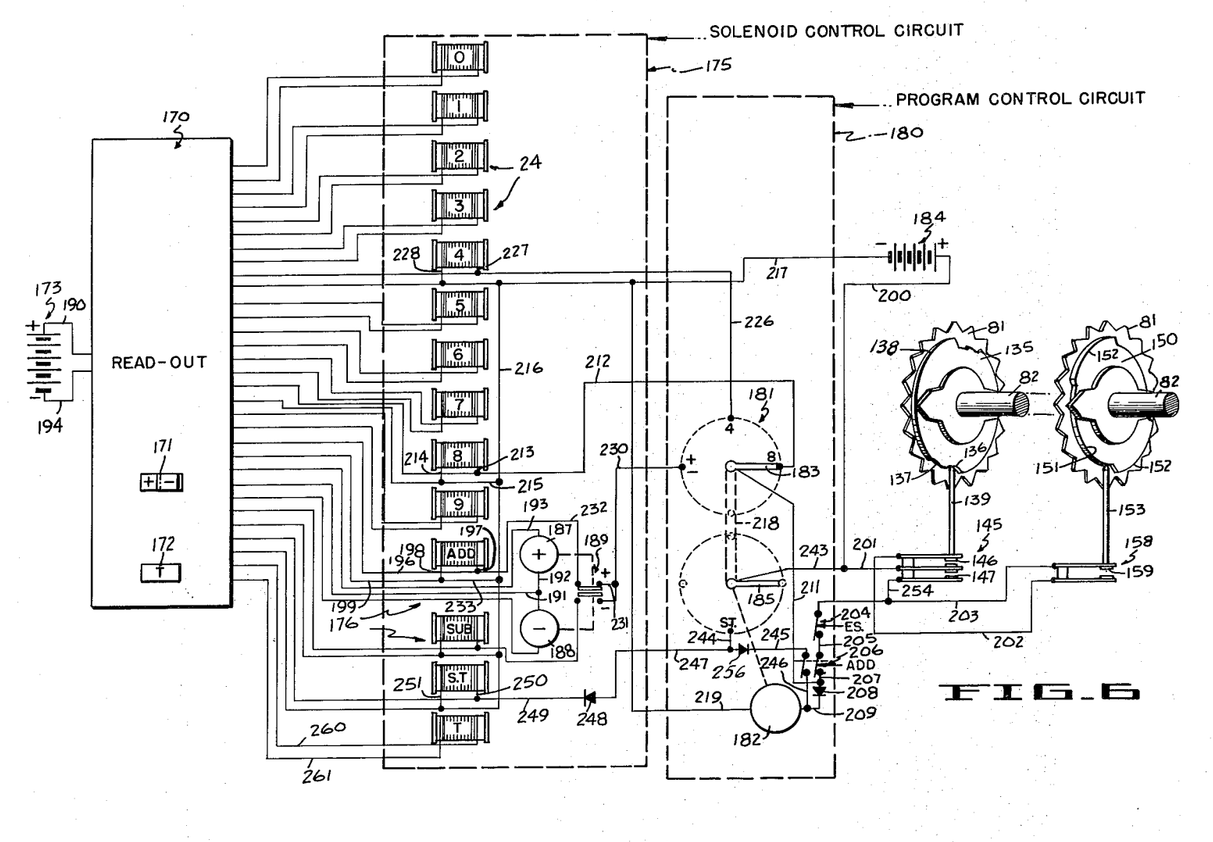
FIG. 6 is an electrical schematic diagram of the present invention, showing the electrical arrangement between the readout, the functional solenoids of the adding machine, and a diagrammatic view of the units and tens-order gear assemblies of the accumulator.

As can be seen in FIGS. 5 and 6, when the sensing cam of the units order 150 is rotated in a positive (or counter-clockwise) direction, it will have no effect on the plunger rod 153 until the cam 150 rotates to a position on the accumulator gear between the "5" to the "6" value. When the cam 150 and gear 81 pass from the "5" to the "6" position, the plunger rod 153 rides up on the high portion 152 of the cam, forcing the plunger rod 153 downwardly to close the contacts 159 of the single-leaf switch 158. The purpose of the switch 158 will be described hereinafter.

When a value of "1" is inserted positively in the tens-order of the accumulator, the cam 135 rotates (in a counter-clockwise direction in these figures), moving the plunger rod 139 onto the second level 137 of the cam 135. Such movement onto the "1" step of the cam forces the plunger 139 downwardly one increment to close a first, or top, pair of contacts 146 of the double-leaf switch 145 (FIGS. 4 and 6). When a positive value of "2" or more is inserted in the tens-order, the cam 135 will be rotated to its outer diameter 138 to move the plunger rod 139 still further down to close the lower contacts 147 of the switch 145, as well as the top contacts 146, to complete a circuit to be described hereinafter.

It can be seen from the above description, when a value of "6" or more is entered into the units order of the accumulator, the units order cam 150 forces its plunger rod 153 downwardly to close the contacts 159 of the single-leaf switch 158. In the same instance, if a value of "1" were entered into the tens-order accumulator gear, the tens-order sensing cam 135 associated with this accumulator gear will force its plunger 139 downwardly one step to close the top set of contacts 146 of the double-leaf switch 145. By virtue of the closing of the switch 158 and the upper contact 146 of switch 145, a circuit will be completed to energize a step switch program that will energize the "8" and "4" value solenoids of the adding machine to enter a value of "84" into these two orders of the selection unit of the adding machine. Likewise, the rotation of the tens-order gear to a value of "2," or more, will cause the high lobe of cam 135 to move under plunger 139, thereby forcing the plunger down two increments to close both pairs 146 and 147 of switch 145. Closing of switch 147 is in a shunt circuit that bypasses switch 158 and energizes the step switch program regardless of the position of the units order gear. Included in this program circuit is a means to initiate a control cycle to enter the value of "84" standing in the selection mechanism either negatively or positively into the accumulator. A subtotal control solenoid will also be energized in the step switch program to print the value that has been accumulated in the accumulator. The complete circuit for this operation will be explained hereinafter.

Referring to FIG. 6, the schematic diagram of the circuit of the present invention comprises: a suitable readout 170 of a conventional weighing apparatus, preferably provided with suitable electrical switches, not illustrated but of conventional construction; a manual add-subtract conditioning lever 171; a total control button 172 to control and initiate control cycles of the adding machine when inserting the initial value determined by the weighing machine into the solenoid-operated adding machine; a solenoid circuit 175 including the value solenoids 24 and control solenoids 176 on the conventional adding machine; a program circuit 180 including a two-level four-point step switch 181 and its energizing coil 182; and the units and tens-order accumulator gears and assemblies diagrammatically shown with their respective electrical switches. The above group of components are electrically connected to suitable D.C. power supplies.

The readout mechanism 170 comprises: conventional electrical switches, not shown in the drawings, of values from "0" to "9," an add switch, a subtract switch, conditional add-subtract switches, a subtotal switch and a total switch, and a D.C. power source 173. The previously mentioned readout switches of the readout 170 are electrically connected to comparable solenoids 24 and 176 of the adding machine, as seen schematically in FIG. 6.

The four-point step switch 181 of the program circuit 180 is provided with two contact banks, a lower and an upper bank. The lower bank has four points of contact, three of these are electrically connected to the "8," "4," and "+" or "—" solenoids of the adding machine, and the fourth being blank. A wiper arm 183 for the lower bank is normally positioned at the "8" point, or home, position of the step switch 181.

The second, or upper, bank also has four points of contact, only one of which is electrically connected, and that to the subtotal solenoid of the adding machine. The upper bank also has a wiper arm 185. The wiper arms 183 and 185 are positioned in vertical alignment fixed on an insulated shaft 218. With this arrangement, the wiper arms 183 and 185 will step together in sequential stepping of the step switch. A separate D.C. power supply 184 is provided for the program circuit to energize the above-mentioned program circuit, as will now be described.

When a value is determined on the weighing apparatus and through a readout such as the type described above, the values so determined close their cooperating switches in the readout 170 to energize the value key solenoids 24 of the adding machine in proper sequence, to enter this value into the selection sectors 39 of the adding machine. The operator will then condition the add-subtract lever 171 located on the readout to energize either an add coil 187 or a subtract 188 of the adding machine to position a double-throw switch 189 in either its positive or negative position. In most instances the add coil 187 would be used. In brief, a circuit for this energization will begin from the plus side 190 of the D.C. power supply 173 of the readout, over conductors 191 and 192 to energize the add coil 187, thereby positioning the double-leaf switch 189 in its add position; and from the coil 187 back to the negative side of the power supply, over the conductors 193 and 194.

The initial positioning of the lever 171 will also close the add switch in the readout to energize the add solenoid. This is accomplished from the positive side 190 of the power supply 173, readout 170, over conductors 196 and 197, to the windings of the add solenoid; and from the add solenoid over the conductors 198, 199 back to the readout 170, and thence to the negative side of the power supply 173. When the add solenoid is energized, it will initiate the add cycle of the adding machine to insert the value positioned in the selection sector 39 into the accumulator 80. It can be said at this time that the add-subtract switches for the conditioning lever 171 are so arranged that only after the sequential operation of the value solenoid switches will the add or subtract switch be operated to ensure full entry of values into the adding machine.

From the above-described arrangement, if, for example, "15" ounces were inserted into the accumulator from the readout mechanism, the tens and units order of the accumulator would register the "15." The "5" entered into the units order would position the cam 150 at its "5" position, which is on the low point 151, as seen in FIGS. 5 and 6; and the "1" entered into the tens order would have positioned its cam 135 to the intermediate step 137 on the cam. The intermediate step 137 on cam 135 will depress the plunger 139 to close top contact 146 of the double-leaf switch 145. This would not complete a circuit to initiate a programmed operation at this time, for the switch 146 is in series with switch 158, which is not closed at this condition. If a value of "1" ounce were now inserted from the readout mechanism into the accumulator in the previous mentioned manner, the units order registering "5" will rotate its cam and gear one increment of movement to move the high point 152 of the cam 150 into position to depress the plunger 153 to close the contacts 159 of the single-leaf switch 158 associated with the units order. This would now complete a circuit to the program step switch 181, for the switch 146 is already closed, and remains so during this addition.

The circuit to initiate the program would come from the plus side of the D.C. power supply 184, over conductors 200, 201 to the top closed contacts 146 of the double-leaf switch 145 of the tens order; from this closed switch over conductor 202 to the closed contacts 159 of the single-leaf switch 158 of the units order; from the closed switch 158 over conductor 203, through a normally closed escapement switch 204, a conductor 205, a double-pole normally closed add cycle switch 206, conductor 207, a diode 208, conductor 209, coil 182, conductors 219 and 217 to the negative side of the power supply to energize the step switch coil 182. Also, a conductor 211 leads from conductor 207 to the lower level wiper arm 183 of the step switch 181 which is normally positioned at the "8," or first, position, through this first position to the windings of the value "8" solenoid over conductors 212, 213, from the windings of the value "8" solenoid back to the negative side of the power supply over conductors 214, 215, 216 and 217, to complete a circuit for energizing the value "8" solenoid in the adding machine.

Figure 1:
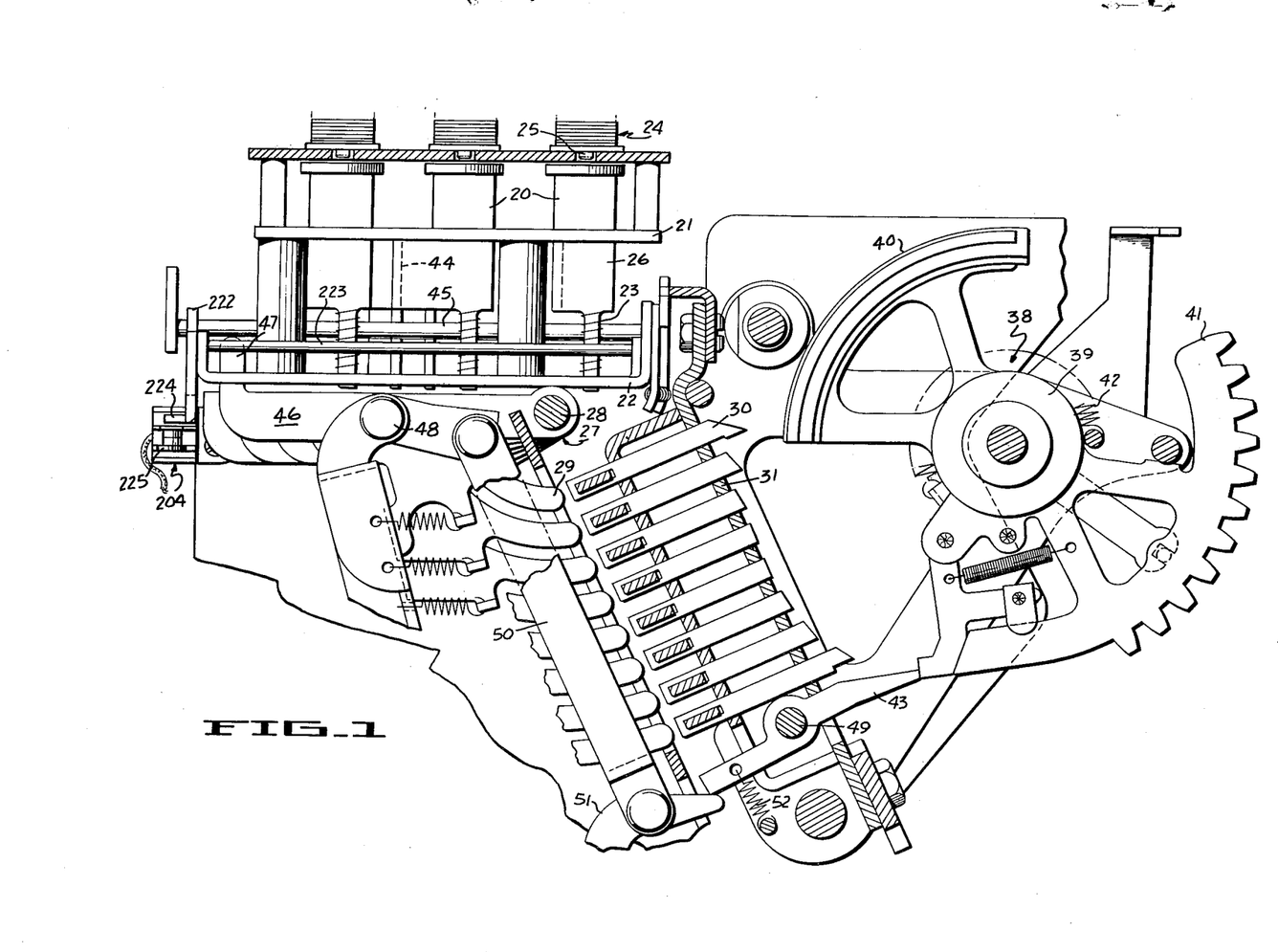
FIG. 1 is a longitudinal cross-sectional view of the selection mechanism of a solenoid-operated adding machine.

Referring to FIG. 1, when a value key 20 is depressed by its energized solenoid 24, as mentioned above, the key stem 26 of the key 20 overlies an escapement rod 45 which releases the selection carriage 38 in sequential leftward steps. The rod 45 extends forwardly of the key box and is pivoted therein. A yoked bellcrank 222 is pivoted on a rod 223 extending longitudinally of the key box and is provided with a yoke formation in engagement with the rod 45. The yoke bellcrank 222 has an ear 224 that is positioned over the normally closed escapement switch 204. An extension 225 on the lower leaf of the switch 204 is extended to be engaged by the ear 224 of the yoke bellcrank 222 when a value key 20 is depressed by its solenoid. The ear 224 thus will engage the extension 225 to open the normally closed contacts of the escapement switch 204 to break the previously energized circuit to pulse the step switch coil 182. The step switch 181 is so constructed that with a de-energizing pulse it will ratchet, by a conventional spring ratchet, to move the wiper arms 183 and 185 to the next contact points on the step switch. It can be mentioned at this time that the upper level of the step switch is identical in construction in that the wiper arm 185 is secured to the insulated shaft 218 on which the lower wiper arm 183 is mounted, so that these wiper arms move synchronously one step (in a counter-clockwise direction in FIG. 6) when the step switch coil 182 is denergized. As mentioned above, the upper deck differs in that it has only one contact, that being the fourth contact, which is the subtotal contact, while the lower deck of the step switch 181 has three contacts, the "8," the "4" and the plus-and-minus (±).

When the wiper arm 183 steps to the next point, or the second point, of the step switch 181, the escapement switch 204 is then again closed by the value key being raised to its normal position by its spring 23. By virtue of the cams 135 and 150 remaining in their respective positions, and their plungers still being depressed, a circuit will now be established to the value "4" solenoid. This circuit runs from the plus side of the D.C. power supply 184, over conductors 200 and 201 to the closed contact 146 of the double-leaf switch 145; from this switch over conductor 202 to the closed contacts 159 of the single-leaf switch 158; from this switch through conductor 203, the normally closed escapement switch 204, conductor 205, the normally closed add cycle switch 206, conductor 207, diode 208, conductor 209 to energize the step switch coil 182. Also, the circuit remains divided at the conductor 207, and goes through conductor 211, wiper arm 183 (now positioned on the "4" position), conductors 226, 227, to the windings of the value "4" solenoid; and from the windings of the value "4" solenoid back to the negative side of the power supply over conductors 228 and 217 to energize the value "4" solenoid in the adding machine.

As mentioned above, with the depression of a value key, the escapement switch 204 will be momentarily opened to pulse the energizing coil 182 to step the wiper arms 183 and 185 to the next position. In this instance, the wiper arm 183 will contact the plus or minus position of the lower deck of the step switch 181. As mentioned previously, the conditioning lever 171 located on the readout 170 was positioned to its positive condition, thereby positioning the double throw switch 189 in its plus position. This switch will still be in the add position.

Therefore, a circuit will now be established to the "add" solenoid to enter the "84" standing in the selection sectors of the adding machine into the accumulator. The circuit can be traced from the plus side of the D.C. power supply 184, over conductors 200, 201, to the closed top contact 146 of the double-leaf switch 145 of the tens order; from this switch over conductor 202 to the closed contacts 159 of the single-leaf switch 158 of the units order; from this switch through conductor 203, the normally closed escapement switch 204, over conductor 205, the normally closed add cycle switch 206, and conductor 207. At this point the circuit is still divided; one line running through diode 208, conductor 209 to energize the step switch coil 182; and the other line running from conductor 207 through conductor 211 to the wiper arm 183 (now positioned at the third contact point, or the plus-minus point of the step switch), and thence through conductors 230, 231 to the double throw switch 189 positioned on the plus position, conductors 232 and 197, to the winding of the "add" solenoid; and from the winding of the "add" solenoid over conductors 198, 233, 216 and 217 to the minus side of the power supply. This will energize the add cycle of the adding machine.

When the "add" solenoid is energized to initiate the add cycle, the machine will add the value of "84" set into the selection sectors into the accumulator, whereby the complement of "16," or "84" is added to the previously accumulated "16" ounces, to convert the "16" ounces by the tens-transfer mechanism of the accumulator to a value of "100," or "1" pound "0" ounces. The tens and units orders will now be positioned at their "0," or low level, positions, thereby opening their corresponding switches 145 and 158, and breaking the program circuit of the step switch 181.

Referring to FIG. 3, when the add key is depressed by its solenoid, the add key will rock a bail 240 pinned to a shaft 241. This is well-known with the adding machine above-mentioned, and a full description of this operation can be had from the above-mentioned patent. The bail has a forwardly directed arm provided with a nose 242 extending downwardly, which nose 242 overlies the normally closed, double break, add-cycle Micro-Switch 206. Thus, when the add key is depressed and the bail 240 is rocked (counter-clockwise as viewed in FIG. 3), the nose 242 will open the contacts of the Micro-Switch 206 momentarily. The break of the switch 206 will step the wiper arms 183 and 185 to their fourth position on the step switch 181. In this position, which we can call the "subtotal station," the lower level has a blank point, as can be seen in FIG. 6, so that no circuit can be established through arm 183. On the other hand, however, the upper level, which has blank contacts at the first three stations, has a contact which is connected to the "Subtotal" solenoid.

Therefore, a new circuit will be established to energize the "Subtotal" solenoid in the adding machine. This circuit runs from the plus side of the D.C. power supply 184, over conductors 200 and 243 to the wiper arm 185 on the upper level of the step switch; from the wiper arm 185 to the "Subtotal" contact and thence to conductor 244. At this point the circuit branches: one branch leading through conductor 245, diode 256, closed add cycle switch 206, conductor 246 to energize the step switch coil 182; and from there through conductors 219 to conductor 217 leading back to the source of supply. The other branch leads from the conductor 244 through conductor 247, diode 248, conductor 249, conductor 250 to windings of the "Subtotal" solenoid; and from the windings of the "Subtotal" solenoid over conductors 251, 216 and 217 back to the negative side of the power supply. This will complete a circuit to the "Subtotal" solenoid to initiate the subtotal machine cycle in the adding machine.

The subtotal operation of the adding machine, as mentioned before, will run the value standing in the accumulator into the actuators so that this value can be printed, and then return the value to the accumulator to be used for further accumulations. In reference to the above-mentioned patent, the subtotal operation will rock the bail 240, as did the add cycle (counter-clockwise in FIG. 1), and by virtue of the nose 242 will open the double-point, add-cycle Micro-Switch 206. The continuous flow of current to the step switch coil 182 will now be broken momentarily, to step the wiper arms 183 and 185 back to the home position, or "8" point. At this point, the circuit to the upper deck of the step switch 181 is open and the step switch coil 182 continues to be deenergized because the switches 145 and 158 are open. At this time the subtotal value of "100" has been printed and the value has been run back into the accumulator, in this instance the units and tens-order gears and cams will register "00" with the "1" being in the third, or units-of-pounds, order.

The above example was given to illustrate operation when ounces were first inserted into the accumulator, with an additional ounce or ounces added to make one pound, in order to show how the cams and the program circuit is initiated by the electrical switches.

If the number of ounces added had brought the total to more than "16" but less than "19," the operation would have been the same, for the units order cam 150 would have closed switch 158 (as it always does for values of "6" through "9"). If the number added had brought the total of "20," or more, the circuit step switch would have been energized and consequent operation would have been the same regardless of the value standing in the units order. When the tens-order registers "2" or more the cam 135 is rotated so that the high lobe 138 engages the plunger 139, pushing the plunger down two steps. In that event, the plunger closes both the upper contacts 146 and the lower contacts 147 of switch 145. Contact 147 is connected to conductor 203, so that the closing of the switch 145 enables current to flow from conductor 201 to pass through contact 147 and conductor 254 directly into conductor 203. Thus, whenever the tens order dial registers a value of "2" or more, the step switch 181 is operated to add "84" to the ounces already in the accumulator.

Another example to illustrate how the step switch program is initiated more than once and the tens-transfer operation of the accumulator of the units and tens order occurs more than once, will now be described. If, for example, a value of "99" ounces is read out of the readout 170 into the selection sectors 39 of the adding machine, and the conditioning lever 171 is set in a plus position to initiate the add cycle to set this value of "99" into the accumulator of the adding machine, the value "99" will be inserted in the units and tens order gear assemblies. Referring to FIGS. 4, 5 and 6, when the units and tens order gear assemblies are rotated in a positive direction (counter-clockwise in these figures) to their "9" positions, the plunger rods 153 and 139 will be moved downwardly, by virtue of the plunger arm 153 of the units order being on the high part 152 of its cam 150 and the plunger rod 139 of the tens order being on its high lobe 138 of the cam 135. The plunger 139 will close both contacts 146 and 147 of the double-leaf switch 145 of the tens order accumulator gear assembly, and plunger 153 will also close the contacts 159 of the single-leaf switch 158 of the units order. This will complete a circuit to the step switch to set up a four-step program sequence to set a constant "84" into the accumulator. Over the circuit described in the above-mentioned example of "16" ounces, the program will be initiated to step the wiper arms 183 and 185 in sequential counter-clockwise steps to insert "84" into the accumulator, the accumulator value to be subtotalled, and the value returned to the accumulator in one complete program operation. After one complete program operation, the accumulator gears will register a value of "183" (i.e., "1" pound, "83" ounces), the "1" in the units-of-pounds order, the "8" in the tens-of-ounces, and the "3" in the units-of-ounces order. This will close the top and bottom switches 146 and 147 of the double-leaf switch cooperating with the tens-order, but the units order registering "3" will be on its low level 151 of its cam 150, therefore, its switch 158 will be open. A new circuit to the program step switch will be established from the plus side of the D.C. power supply 184 over conductors 200, 201 to the bottom contact 147 of the switch 145; and from this bottom contact over conductor 254 to the conductor 203. The remaining part of the circuit will be identical to the above-mentioned example of "16" ounces. A constant value of "84" will now be inserted into the accumulator for the second time to be added to the previous total of "183," and also printed and returned to the accumulator by the subtotal cycle. This will change the accumulator gear assemblies to register a value of "267," the "2" in the units-of-pounds order, the "6" in the tens-of-ounces, and the "7" in the units-of-ounces order. This value will close both the top and bottom contacts 146 and 147 of the double-leaf switch 145, and also the single-leaf switch 158, to complete a circuit to the program step switch to add a third value of "84."

A value of "84" will be inserted into the accumulator by the step switch program for a third time to change the accumulator reading from "267" to "351," the "3" being in the units-of-pounds order, the "5" in the tens-of-ounces, and the "1" in the units-of-ounces order. This will position the units order cam in its low position, thereby opening its switch, but the tens-order cam having been rotated to its high level 138, will have its contacts 146 and 147 closed to complete a circuit over the conductor 254, as previously mentioned. This will initiate a fourth program of the step switch 181 to insert a value of "84" into the accumulator for a fourth time. This will change the total in the accumulator gears from "351" to a reading of "435," the "4" being in the units-of-pounds order and the "3" in the tens-of-ounces and the "5" in the units-of-ounces orders, respectively. The units order being in its "5" position will still be on its "low" point 151 of the cam 150 and will have its switch 158 open; but the tens-order will be on its "3" position, or on the high level 138, and therefore the contacts 146 and 147 are closed to complete another circuit to the program step switch 181 to insert a value of "84" into the accumulator for a fifth time by the previously mentioned circuit. The value in the accumulator will now be changed from "435" to "519," the "5" being in the units-of-pounds, the "1" in the tens-of-ounces, and the "9" in the units-of-ounces orders. The units order which is positioned at "9" will have its plunger engaging the high point 152 of its cam, thereby closing its switch 158; and the tens-order being in its "1" position will have its plunger on its intermediate step 137, closing the top contact 146 of the switch 145. This will complete another energizing circuit to the step switch 181 to program a value of "84" for the sixth time to be added to the previous value standing in the accumulator. The value in the accumulator will now be changed from "519" to "603" (i.e., "6" pounds, "3" ounces), the "6" being in the units-of-pounds order, the "0" in the tens-of-ounces and the "3" being in the units-of-ounces orders. The units order registering "3" will be positioned on the low part of its cam 151, thereby leaving its switch 158 open. The tens order registering "0" will have its top contact 126 open, and the automatic operation of the program step switch will automatically be terminated with the value of "603" ("6" pounds, "3" ounces) being printed by the subtotal operation, and the value returned by the subtotal operation back into the accumulator.

At any time, if desired by the operator, the accumulator can be cleared for future accumulations by the total button 172 located on the readout 170. The button 172 will close its cooperating switches in the readout to initiate a total operation of the adding machine. The circuit will be energized from the plus side of the D.C. power supply of the readout 173 over conductors 190, 260 to the winding of the total solenoid, from the winding of the total solenoid back to the minus side, over conductors 261 and 194, to complete a circuit to the total solenoid of the adding machine. A total cycle of the adding machine, as mentioned above, will read the total out of the accumulator to be printed and on the return, or upward, stroke of the actuators 58, as mentioned heretofore, the positive gear transmission 62 will be positioned in its intermediate, or inoperative, position, whereby the accumulator will be left zeroized.

The following is a chart of the example of "99" ounces set into the accumulator, with each step being shown after each program operation of the step switch and the entering of the value "84" to the previous value to the positions of the accumulator gear assemblies of the hundredths, tens, and units orders in relation to their electrical switches:

| Program Operation | Accumulator Value | | | Tens Order Switch 145 | | Units Order Switch 158 |
|---|---|---|---|---|---|---|
| | Lbs. | Tens of Ozs. | Units of Ozs. | Upper | Lower | |
| 1 | 0 | 9 | 9 | C | C | C |
| 2 | 1 | 8 | 3 | C | C | O |
| 3 | 2 | 6 | 7 | C | C | O |
| 4 | 3 | 5 | 1 | C | C | O |
| 5 | 4 | 3 | 5 | C | C | O |
| 6 | 5 | 1 | 9 | C | O | O |
| | 6 | 0 | 3 | O | O | O |

"C" indicates switch closed.
"O" indicates switch open.

The accumulator of the adding machine is such, as mentioned above, that it is provided with a negative tens-transfer mechanism, in which values of pounds and ounces, or ounces, can be negatively taken from the accumulated total and by virtue of its tens-transfer mechanism will print the correct pounds and ounces in the adding machine. For example, to subtract "15" ounces from the above value of "6" pounds, "3" ounces, the operator would first position the add-subtract conditioning lever 171, located on the readout 170, to its subtract position. Then the operating signal to the readout would cause the machine to cycle to insert the value of "15" into the accumulator in a negative direction. By virtue of the negative tens-transfer mechanism, the accumulator gears would now register a value of "588," the "5" registered in the units-of-pounds order, "8" in the tens-of-ounces order and "8" in the units-of-ounces order. The cams 135 and 150 would both be positioned on their high points 138 and 152 opposite their plunger rods, closing both gaps of the switch 145 and also switch 158. This will complete a circuit to the step switch to set up a four-step program sequence, to set a value of "84" into the accumulator subtractively as the double throw switch 189 is set for subtraction. The subtractive operation would be determined at the outset of the operation when the operator presets the lever 171 in its negative position. By automatic insertion of the negative value of "84" into the accumulator to the previous value of "588," the accumulator gears will be rotated negatively to change this value of "588" to "504," or "5" pounds, "4" ounces. The tens order cam 135 will now be positioned at a "0" value, or its low step, thereby opening both switches 146 and 147 of the units order double-leaf switch 145. The units order cam 150 will now be positioned at its "4" value which is registered with its low portion 151, thereby opening its switch 158. With both switches 145 and 158 now being opened, the operation of the step switch will automatically be terminated and the value of "5" pounds "4" ounces would be printed for visual inspection.

The examples mentioned above are to show the flexibility of the arrangement of the present accumulator with its tens-transfer mechanism for converting ounces, and pounds and ounces, to the correct total of pounds and ounces, if any.

I claim:

1. In an adding machine comprising an actuator and an accumulator, a solenoid operated input indexing mechanism, a sensing means for the units and tens order of said accumulator for sensing predetermined combinations of digits in said orders, a step switch operative to operate said solenoids to insert a constant value into the units and tens order of said indexing mechanism, and means operable by said sensing means to initiate operation of said step switch.

2. In an adding machine comprising an actuator and an accumulator, a solenoid operated input indexing mechanism, a sensing means for the units and tens order of said accumulator for sensing predetermined combinations of digits in said orders, a step switch operative to operate said solenoids to insert a constant value of "84" into the units and tens order of said indexing mechanism, and means operable by said sensing means to initiate operation of said step switch.

3. In an adding machine comprising an accumulator having a tens-transfer mechanism between orders, an electric-solenoid-operated input means for inserting numbers of pounds and ounces into said accumulator, a step switch operative to electrically operate said solenoids of said input means, and sensing means operated by the lowest two orders of said accumulator when angularly positioned to register a value of "16" or more for operating said step switch to actuate said selection solenoids to insert a constant value of "84" into said accumulator, whereby said accumulator with its said tens-transfer will convert the value of ounces into the correct pounds and ounces.

4. In an adding machine, input means including electric solenoids, an accumulator, a sensing means for the units and tens orders of the accumulator, an electrically operated step switch connected to certain ones of said input solenoids for operating them in a sequence, and means operated by said sensing means to operate said step switch and operate said input solenoids.

5. In an adding machine, input means including electric solenoids an accumulator, a sensing means for the units and tens orders of the accumulator, an electrically operated step switch connected to certain ones of said input solenoids for operating them in a sequence, said sensing means when positioned to register a value of "16" or more will operate said step switch to operate said solenoid, to insert a constant value of "84" into said input means.

6. In an adding machine, an accumulator having a tens-transfer mechanism between orders, a solenoid operated input selection unit for inserting pounds and ounces into said adding machine, sensing means for the units order of said accumulator to sense a value of "6" or more, or "5" or less, sensing means for the tens order of said accumulator to sense a value of "1" or "2" or more, and a step switch responsive to said sensing means operative when the units order senses a value of "6" or more and the tens order registers a value of "1," or when said tens order senses a value of "2" or more, to operate said input mechanism for inserting a constant value of 84.

7. In an adding machine, an accumulator having a tens-transfer mechanism between orders, a solenoid operated input selection unit for inserting pounds and ounces into said adding machine, sensing means for the units order of said accumulator to sense a value of "6," or more or "5" or less, sensing means for the tens order of said accumulator to sense a value of "1," or "2" or more, a first electric switch for the units order operable by said sensing means when a value of "6" or more is registered, second and third electric switches for the tens order, said second switch being operated when said tens order registers a value of "1" and both said second and third switches being operated when said tens order registers a value of "2" or more, a step switch operative to operate said input mechanism for inserting a constant value of 84, a circuit controlled by said first and second switches operative when said units order registers a value of "6" or more and tens order registers a value of "1"

for operating said step switch, and a second circuit controlled by said third switch operative when said tens order registers a value of "2" or more for operating said step switch.

8. In an adding machine comprising an accumulator, a solenoid operated input indexing mechanism, a sensing means for the units and tens order of said accumulator, a step switch operative when energized to operate said solenoids to insert a predetermined complementary value into said units and tens order of said indexing mechanism, and means operable by said sensing means to energize said step switch.

9. In an adding machine comprising an accumulator, a solenoid operated input indexing mechanism, a sensing means for predetermined orders of said accumulator, a step switch operative when actuated to operate said solenoids to insert a predetermined constant value into said predetermined orders of said indexing mechanism, and means operable by said sensing means to actuate said step switch.

10. In a calculating machine for adding and subtracting numbers, an accumulator for accumulating the algebraic sum of numbers entered additively and subtractively therein, means for entering numbers into said accumulator including machine-responsive means for entering a preselected number therein, sensing-and-control means responsive to the presence of predetermined combinations of digits in predetermined orders of said accumulator for actuating said machine-responsive means, and add-subtract selection means shiftable between two settings for setting said entering means alternatively for addition and subtraction, said selection means being free of any control by said sensing-and-control means, whereby each entry of said predetermined number by said machine-responsive means is made in the same sense (additively or subtractively) as the immediately preceding entry.

11. The combination of claim 10 wherein said machine-responsive means includes electromagnets, wherein said sensing-and-control means includes electric switches actuated by said predetermined orders of said accumulator for sensing said combinations of digits, and includes also an electric step switch responsive to said sensing switches for causing said machine-responsive means to enter the separate ordinal digits of said preselected number in succession.

12. In a calculating machine for adding numbers, a number-selector unit, means for entering numbers into said selector unit including first machine-responsive means for entering a preselected number therein, an accumlator for accumulating the total of numbers successively entered therein, interregister transfer means for transferring numbers from said selector to said accumulator, second machine-responsive means for actuating said interregister transfer means, a program controlling device, a sensing device responsive to the presence of predetermined combinations of digits in predetermined orders of said accumulator for actuating said program-control device, said program-control device being responsive to actuation by said sensing device for successively (1) actuating said first machine-responsive means, (2) actuating said second machine-responsive means, and (3) returning itself to a condition of responsiveness to said sensing device.

13. The combination of claim 12 wherein said first and second machine-responsive means include electromagnets, wherein said program control device includes an electric step switch, and wherein said sensing device includes electric switches actuated by said predetermined orders of said accumulator.

14. The combination of claim 12 wherein said program control device actuates said first machine-responsive means for entering the ordinal digits of said predetermined numbers in succession, then actuates said second machine-responsive means, and then returns to said condition of responsiveness to said sensing device.

15. The combination of claim 14 wherein said first and second machine-responsive means include electromagnets, wherein said program control device includes an electric step switch, and wherein said sensing device includes electric switches actuated by said predetermined orders of said accumulator.

16. In a calculating machine for adding numbers, an accumulator for accumulating the total of numbers successively entered therein, a selector for registering numbers, means for entering into said accumulator numbers registered in said selector, machine-responsive means for separately registering each digit of a preselected number in said selector, a program control device operable when actuated for causing said machine-responsive means to register in succession in said selector the separate ordinal digits of said preselected number, and a sensing device responsive to the presence of predetermined combinations of digits in predetermined orders of said accumulator for actuating said program control device.

17. In a calculating machine for adding numbers, an accumulator for accumulating the total of numbers successively entered therein, means including electromagnets responsive to said machine for entering a preselected number into said accumulator, a program control device including an electric step switch operable when actuated for causing said electromagnets to enter in succession the separate ordinal digits of said preselected number, and a sensing device responsive to the presence of predetermined combinations of digits in predetermined orders of said accumulator for actuating said program control device, said sensing device including electric switches actuated by said predetermined orders.

References Cited in the file of this patent

UNITED STATES PATENTS

| | | |
|---|---|---|
| 1,487,703 | Barr | Mar. 25, 1924 |
| 1,487,704 | Barr | Mar. 25, 1924 |
| 2,172,749 | Going | Sept. 12, 1939 |
| 2,178,064 | Bryce | Oct. 31, 1939 |
| 2,211,736 | Avery | Aug. 13, 1940 |